2 Sheets--Sheet 1.

W. WHEELOCK.
Binders' Attachments for Harvesters.

No. 151,329. Patented May 26, 1874.

WITNESSES.
A.W. Almqvist
C. Sedgwick

INVENTOR.
W. Wheelock
BY
Munn
ATTORNEYS.

2 Sheets--Sheet 2.

W. WHEELOCK.
Binders' Attachments for Harvesters.

No. 151,329. Patented May 26, 1874.

WITNESSES.
A. W. Almquist
C. Sedgwick

INVENTOR.
W. Wheelock
BY
ATTORNEYS.

UNITED STATES PATENT OFFICE.

WILLIS WHEELOCK, OF DECORAH, IOWA, ASSIGNOR OF ONE-HALF HIS RIGHT TO WILLIAM T. BAKER, OF SAME PLACE.

IMPROVEMENT IN BINDERS' ATTACHMENTS FOR HARVESTERS.

Specification forming part of Letters Patent No. 151,329, dated May 26, 1874; application filed February 14, 1874.

*To all whom it may concern:*

Figure 1:
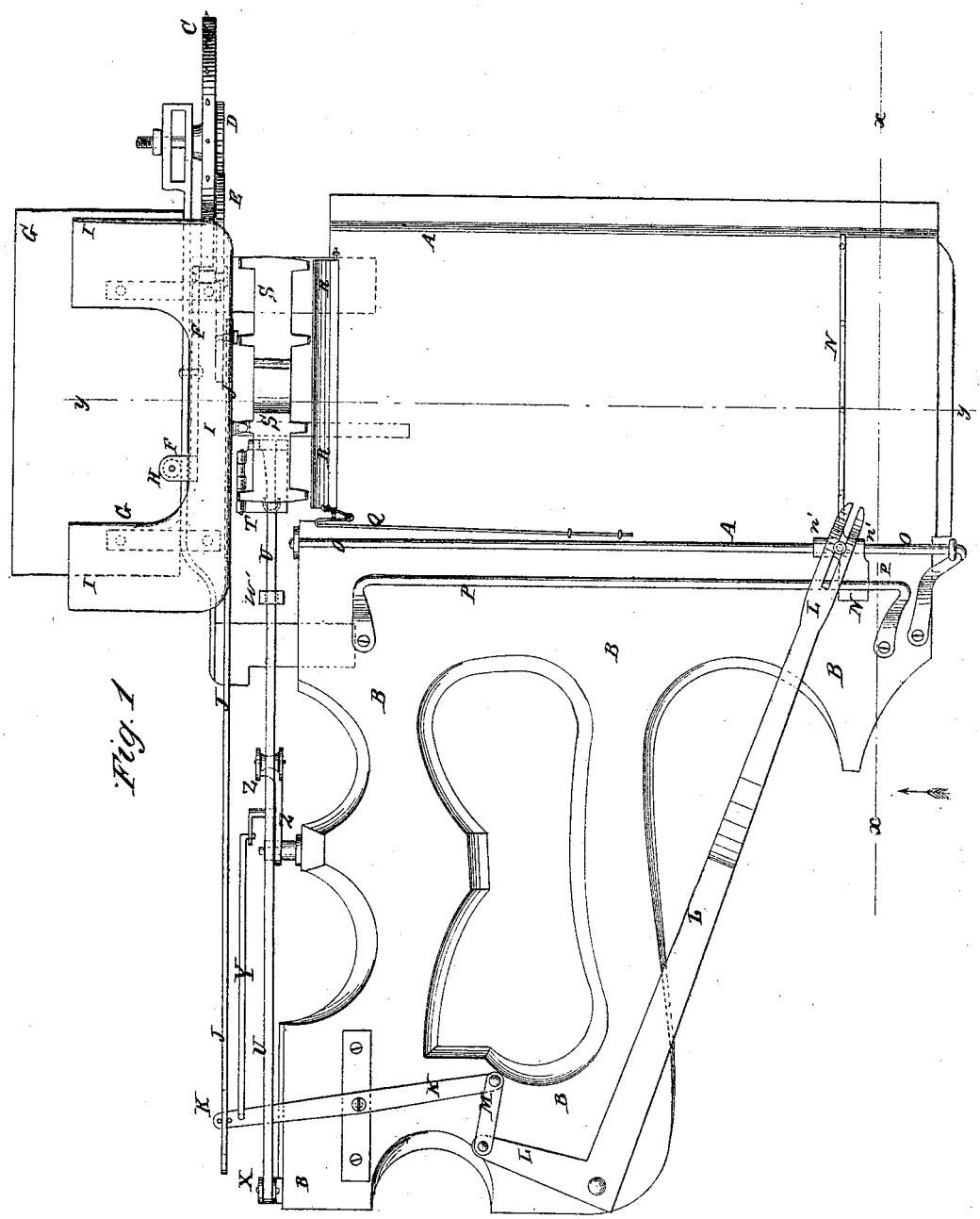
Figure 2:
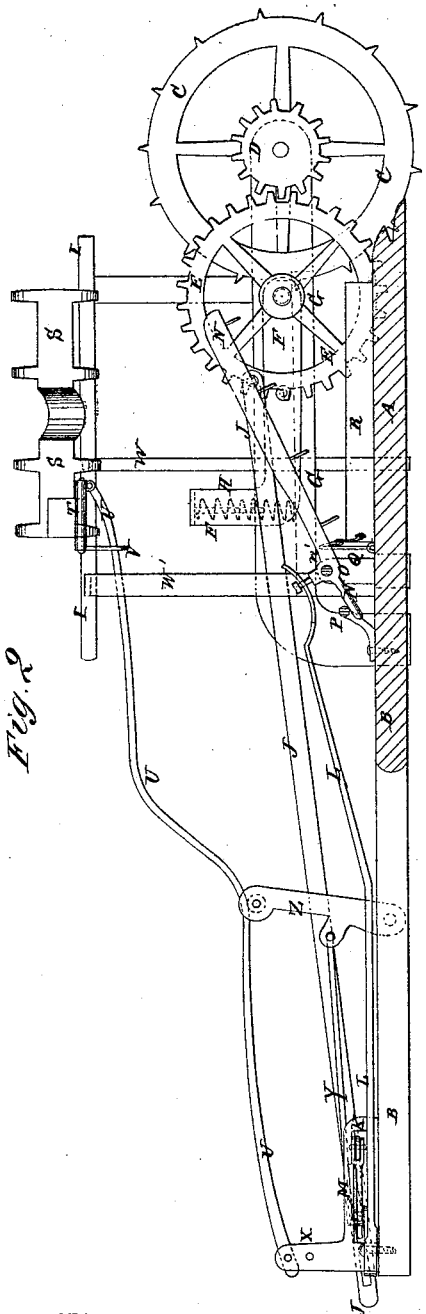
Figure 3:
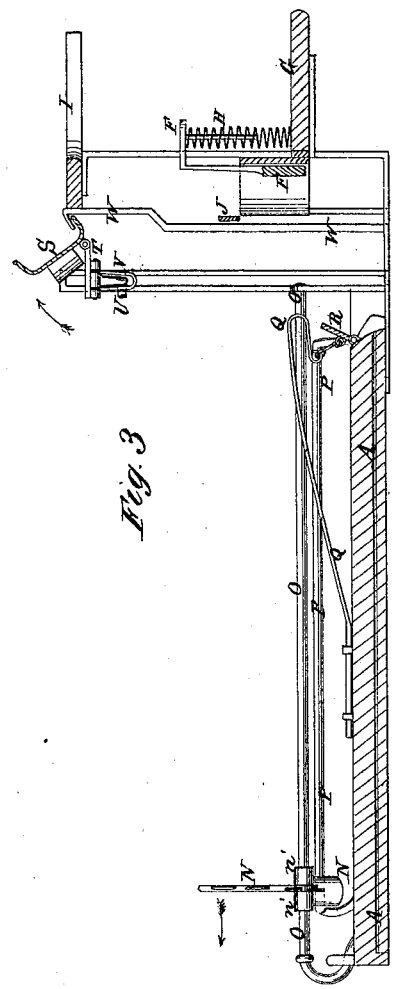

Be it known that I, WILLIS WHEELOCK, of Decorah, in the county of Winneshiek and State of Iowa, have invented a new and useful Improvement in Automatic Rake for Harvesters, of which the following is a specification:

Figure 1, Sheet 1, is a top view of a portion of a harvester to which my improvement has been applied. Fig. 2, Sheet 2, is a side view of the same, partly in section, through the line $x$ $x$, Fig. 1. Fig. 3, Sheet 2, is a vertical cross-section of the same taken through the line $y$ $y$, Fig. 1.

Similar letters of reference indicate corresponding parts.

My invention has for its object to furnish an automatic raking attachment for harvesters, which shall be so constructed as to collect the cut grain into a gavel and raise it to the binders' table, and which shall be simple in construction and reliable in operation.

The several features of my invention will first be fully described, and then pointed out in the claims.

A represents a harvester-platform, upon which the cut grain falls, and with the rear edge of which is connected a platform or frame, B, to receive and support the operating parts of the device. C is the drive-wheel, with which is rigidly connected a small gear-wheel, D, into the teeth of which mesh the teeth of a larger gear-wheel, E. The gear-wheel E is pivoted to the forward end of a lever, F, which is pivoted to the frame-work of the machine, and the rear end of which projects up at the edge of the binders' platform G, and has a spring, H, connected with it, so that the binder, by placing his foot upon the end of the lever F and pressing downward, can raise the wheel E out of gear with the wheel D. This construction enables the binder to equalize the gavels by allowing the rake to operate only when a proper amount of cut grain has fallen upon the platform A. I is the table upon which the gavel is laid to be bound. The binders' platform G and table I are connected with the frame-work of the machine by iron bars, which may be stiff or jointed, as may be desired. To the gear-wheel E is attached a crank-pin, to which is pivoted the forward end of a long connecting-rod, J, the rear end of which is slotted to receive the end of the lever K, so that the said lever K may be moved by the connecting-rod J as it approaches each end of its stroke. This allows the rake to stand still for a short time at each end of the platform A. The lever K is pivoted to the rear part of the platform or frame B, and its inner end is connected with the end of the short arm of the elbow-lever L, by a short connecting-bar, M, or by gear-segments, as may be desired. The bent lever L is pivoted at its angle to the rear part of the platform or frame B, and its forward end is slotted longitudinally to receive a pin attached to the rake-head N, just above its socket, so that the said rake-head may move across the platform A in a straight line, while the end of the lever L moves in the arc of a circle. The socket $n$ of the rake-head N is located near its rear end, and is made large enough to receive and fit upon the rod O, and so long that the rake-head will move squarely across the platform, even when sweeping the cut grain before it. The rod O crosses the rear part of the platform A, and its ends are bent downward and are attached to said platform A, at or near its side edges, so that the rake-head N may sweep the platform from side to side. P is a rod, placed a little in the rear of and parallel with the rod O, and the ends of which are bent downward, are inclined to the rearward, and are attached to the said platform. The rod P is made so much shorter than the rod O that the rear end of the rake-head N may be free from the rod P when it is at each end of the rod O. Q is a spring, the inner end of which is attached to the middle part of the platform A, a little in front of the rod O. The free end of the spring Q extends to or nearly to the end of the rod O, and must be of sufficient strength to raise the forward end of the rake-head when its rear end passes from the rod P, so that as the rake-head moves back its rear end may pass beneath the rod P, and its forward part may be raised out of the way of the falling grain. As the rake-head N comes to the outer edge of the platform A, its rear end escapes from the rod P, which allows its forward part to drop to the said platform so as to sweep the grain before it as it moves forward. The forward part of the rake-head N, while sweeping the grain before it, is kept from rising by the rod P, which is now beneath its rear end. To the inner edge of the platform A is pivoted an apron, R, which is connected with the spring Q so as to be lowered as the spring Q is forced down by the advancing rake, and allow the gavel to pass to the receiver S. As the rake-head N rises to return, the apron R is raised by the spring Q to prevent the grain from falling from the platform, while the receiver S is raised to deliver the gavel.

The receiver S is hinged, at the outer edge of its rear end, to a plate, T, which is hinged at its forward end to the forward end of the lever U, and is provided, at its rear end, with a loop, V, passing around the said lever U. W is a bar passing up at the outer edge of the receiver S, to serve as a guide to the said receiver, to keep it from coming in contact with the connecting-rod J, and the upper end of which is bent inward to catch upon the inner edge of the receiver S, and tilt it, as shown in Figs. 2 and 3, so that the binder may more conveniently remove the gavel from it. The middle part of the receiver S is concaved, to enable the binder to more readily pass his arms around the gavel. The lever U passes back through a slotted guide-standard, W', attached to the frame or platform B, and its rear end is pivoted to a short standard, X, attached to the rear end of the platform or frame B. To the outer end of the lever K, at the inner side of the connecting-rod J, is pivoted the rear end of the connecting-rod Y, the forward end of which is pivoted to the lever Z. The lower end of the lever Z is pivoted to the platform or frame B, and its upper end is notched or forked to receive the lever U, and raise it and the receiver S at the proper time to deliver the gavel to the binder. The notch or fork of the lever Z should have a small friction-roller pivoted in it to diminish the friction as it comes in contact with the lever U.

Having thus described my invention, I claim as new and desire to secure by Letters Patent—

1. The combination, with table I, of the end-hooked rod W, hinged receiver S, hinged plate T, and vertically-movable lever U, to deliver the gavel at the table, in the manner described.

2. The combination of lever F, constructed as described, spring H, gear-wheels D E, and drive-wheel C, for operating the rake and receiver, substantially as and for the purpose specified.

3. The receiver S, hinged plate T, and lever U, in combination with the rake N, the hinged apron R, and the platform of a harvester, substantially as herein shown and described.

4. The combination of the slotted connecting-rod J, lever K, and slotted elbow-lever L, with the rake N and gearing E D, for the purpose of giving motion to said rake N, substantially as herein shown and described.

5. The combination of the connecting-rod Y and notched or forked lever Z with the levers U K and the connecting-rod J, for the purpose of giving motion to the receiver S from the gearing E D, substantially as herein shown and described.

WILLIS WHEELOCK.

Witnesses:
T. W. BURDICK,
A. T. RÓEN.